United States Patent [19]

Tsuchida et al.

[11] Patent Number: 4,622,357

[45] Date of Patent: Nov. 11, 1986

[54] PRESSURE-SENSITIVE ADHESIVE COMPOSITIONS

[75] Inventors: Seiichi Tsuchida, Sakai; Yoshihiro Kodama, Kobe; Hiroari Hara, Osaka, all of Japan

[73] Assignee: Arakawa Kagaku Kogyo Kabushiki Kaisha, Japan

[21] Appl. No.: 713,395

[22] PCT Filed: Jul. 9, 1984

[86] PCT No.: PCT/JP84/00350

§ 371 Date: Mar. 8, 1985

§ 102(e) Date: Mar. 8, 1985

[87] PCT Pub. No.: WO85/00376

PCT Pub. Date: Jan. 31, 1985

[30] Foreign Application Priority Data

Jul. 13, 1983 [JP] Japan ................. 58-128159

[51] Int. Cl.$^4$ .............. C09J 3/12; C08L 9/06
[52] U.S. Cl. .................... 524/270; 524/271; 524/274; 524/505; 525/54.44
[58] Field of Search ............ 524/270, 271, 274, 505; 525/54.55

[56] References Cited

U.S. PATENT DOCUMENTS

| | | | |
|---|---|---|---|
| 3,211,683 | 10/1965 | Arakana et al. | 524/274 |
| 3,427,269 | 2/1969 | Davis et al. | 524/271 |
| 3,519,585 | 7/1970 | Miller | 524/271 |
| 3,632,540 | 1/1972 | Unmuth et al. | 524/274 |
| 3,658,740 | 4/1972 | Marrs et al. | 524/274 |
| 3,686,107 | 8/1972 | Russell | 524/274 |
| 3,736,281 | 5/1973 | Russell | 524/271 |
| 4,248,770 | 2/1981 | Matsuo et al. | 524/270 |
| 4,284,541 | 8/1981 | Takeda et al. | 524/272 |
| 4,302,371 | 11/1981 | Matsuo et al. | 524/274 |
| 4,325,770 | 4/1982 | Korpman | 524/274 |

FOREIGN PATENT DOCUMENTS 1033115 6/1963 United Kingdom .

OTHER PUBLICATIONS

Derwent Abst. 28019e/14 (SU-834062) 5-1981.
Derwent Abst. 30115c/17 (J55035633) 3-1980.
Derwent Abst. 03379x/02 (SU453269) 5-1975.
Derwent Abst. 16931e/09 (J57014675) 1-1982.
Derwent Abst. 26936k/11 (SU-925976) 5-1982.

*Primary Examiner*—Herbert J. Lilling
*Attorney, Agent, or Firm*—Larson and Taylor

[57] ABSTRACT

A pressure-sensitive adhesive composition comprising a block rubber, a tackifying resin and a plasticizer as major components, the composition being characterized in that the tackifying resin is partially fumarized and/or partially maleinized, disproportionated rosin ester.

10 Claims, No Drawings

PRESSURE-SENSITIVE ADHESIVE COMPOSITIONS

FIELD OF THE INVENTION

This invention relates to novel pressure-sensitive adhesive compositions, and more particularly to hot-melt or high solid solvent-type pressure-sensitive adhesive compositions containing a specific type of stabilized rosin ester as a tackifying resin.

BACKGROUND ART

Common pressure-sensitive adhesives heretofore known include those comprising a rubber-type high-molecular-weight substance as a base polymer, tackifying resin, plasticizer and when required, stabilizer, antioxidant, filler, coloring agent and the like. These pressure-sensitive adhesives are applied in the form of a solution or emulsion or in a molten state to a substrate of cellophane, paper, cloth, plastics film, metal foil or the like, and dried to produce an adhesive tape, adhesive sheet or adhesive label. Generally natural rubber, styrene-butadiene rubber, acrylic resin and the like have been used as the rubber-type high-molecular-weight substance in the foregoing solvent-type pressure-sensitive adhesive. However, in light of environmental protection, saving of resources, increase of productivity, etc., recently hot-melt or high solid (solvent-type but high in solids content) pressure-sensitive adhesives containing the so-called block rubber as a base polymer have been increasingly used in place of the solvent-type pressure sensitive adhesives incorporating the rubber-type high molecular-weight substance. These resource-saving pressure sensitive adhesives such as hot-melt type, etc. generally contain a block rubber, tackifying resin and plasticizer (mainly oil) as major components in a weight ratio of 100:70–150:20–30. However, these pressure sensitive adhesives are yet unsatisfactory in cold resistance (tack at low temperatures), preparation of compounds, handle-ability during application and economy as compared with conventional solvent-type pressure sensitive adhesives containing a natural rubber or the like as a base material. Studies are under way to overcome these problems and particularly to improve the cold resistance by using an increased amount of the plasticizer component. More specifically, if the amount of the plasticizer component generally used in the above ratio relative to the block rubber is increased to about 50 to about 100 by weight, the pressure-sensitive adhesive is given a higher degree of cold resistance. On the other hand, the increase of the plasticizer amount to such level causes other drawbacks that packaging tapes are imparted a lower adhesive property (adhesion to corrugated boards) and that labels are made unfit for use because the plasticizer penetrates the surface of labels. Presumably these drawbacks are all caused mainly by the transfer of plasticizer. Accordingly, it is desired in industries to develop a novel tackifying resin which can overcome the drawbacks without the transfer of plasticizer.

We conducted extensive research to eliminate the foregoing drawbacks of hot-melt or high solid pressure-sensitive adhesives and particularly to explore tackifying resins to be used for the adhesives. Generally tackifying resins for pressure-sensitive adhesives must fulfil the following major requirements for properties; (1) to be outstanding in three adhesive characteristics (tack, adhesion and cohesion) in a normal state, (2) to keep the plasticizer from bleeding (to give packaging adhesives a high adhesion to corrugated boards and to provide labels with the surface free from the bleeding of plasticizer), (3) to exhibit high aging resistance and good thermostability. Among the tackifying resins heretofore used are terpene resin, aliphatic petroleum resin, hydrogenated petroleum resin, disproportionated rosin ester and the like. It has been found that these resins are insufficient to fulfil the foregoing requirements and remain to be improved in respect of the aforesaid problems and especially cold resistance. When tested in use for adhesives, aliphatic petroleum resin (usually having a softening point of about 100° C.) was found to allow the transfer of plasticizer in the adhesive, reduction in adhesion to corrugated boards and bleeding of plasticizer into the surface of labels. Further, resins of high softening points such as terpene resin (generally having a softening point of about 115° C.), hydrogenated petroleum resin (having a softening point of about 125° C.), fumarized rosin ester (having a softening point of about 125° C.) and the like were checked for properties. As a result, the terpene resin was found low in aging resistance, thermostability and adhesion to corrugated boards, and the hydrogenated petroleum resin was discovered to lead to the transfer of plasticizer although high in aging resistance and thermostability, hence undesirable. Thus we were unable to find that there invariably exists correlation between the softening point of the resin used and the transfer of plasticizer. With a high polarity, the fumarized rosin ester was expected to be free of the transfer of plasticizer, but was found unsatisfactory in any of the properties stated above in (1) to (3). The disproportionated rosin ester was insufficient in respect of the transfer of plasticizer although excellent in aging resistance and thermostability.

The results of our research described above show that the causal relation between the foregoing drawbacks and the kinds of the resin used is not clear since it is thought that the sofening point and polarity of the resin, the number of the functional groups of the resin, etc. are complicatedly related to one another. Accordingly, it was unpredictable what tacki flying resin can be effectively used to improve the properties of hotmelt or like pressure-sensitive adhesives containing a block rubber. However, based on the results thus obtained, we continued the research efforts, preparing various kinds of resins and unexpectedly found that the disproportionated rosin ester partially fumarized or maleinized is useful and the use thereof can eliminate the foregoing problems in respect of cold resistance, transfer of plasticizer, etc. The present invention has been accomplished based on this novel finding.

DISCLOUSE OF THE INVENTION

This invention provides a pressure-sensitive adhesive composition containing a block rubber, a tackifying resin and a plasticizer as major components, the composition being characterized in that the tackifying resin is partially fumarized and/or partially maleinized, disproportionated rosin ester (hereinafter referred to as "stabilized rosin ester").

The pressure-sensitive adhesive compositions of the present invention essentially contain a block rubber to impart a suitable coating ability and melt viscosity to the composition. The block rubbers which can be used in the present invention are not limited to particular kinds, and those conventionally used are usable as they are. Typical examples of useful block rubbers are those composed of blocks of non-elastomeric polymer and blocks of elastomeric conjugated diene polymer, such as polystyrene-polyisoprene polystyrene block copolymer, polystyrene-polybutadiene-polystyrene block copolymer, etc. Examples of those commercially available are "KRATON 1102," "KRATON 1107" and "KRATON 4141," products of Shell Chemical Co., Ltd. When the composition of the present invention is used as a high solid pressure-sensitive adhesive, natural rubber, styrene-butadiene rubber or the like can be employed in conjunction with block rubber for economical reason. The amount of such rubber partially replacing the block rubber is limited to up to 30% by weight of the block rubber in consideration of the viscosity of the resulting pressure sensitive adhesive and the nonvolatiles contained therein.

It is critical in the present invention that the stabilized rosin ester incorporated as the tackifying resin in the present composition be partially fumarized and/or partially maleinized, disproportionated rosin ester. These resins can be prepared according to conventional methods, for example, by reacting partially fumarized and/or partially maleinized rosin with alcohol to obtain rosin ester which is then disproportionated. The partially fumarized and/or partially maleinized rosin used is not limited to particular kinds, and can be prepared by conventional methods. For example, such rosin can be prepared by mixing rosin as the starting material with fumaric acid or maleic anhydride and heating the mixture to give an addition product of the Diels-Alder type. The rosin used as the starting material can be any of gum rosin, wood rosin and tall oil rosin. The ratio of fumaric acid or maleic anhydride to be used relative to the rosin in the reaction is limited on the basis of the compatibility of stablilized rosin ester (obtained by the subsequent reaction) with the block rubber, the adhesive property thereof, etc. Generally 1.3 to 20 mole %, preferably 2.6 to 13 mole %, of the fumaric acid or maleic anhydride is used based on the rosin. If less than 1.3 mole % thereof is present, the transfer of plasticizer results, hence undesirable. The presence of more than 20 mole % thereof leads to reduction in the compatibility, consequently to pronounced impairment of tack, hence undesirable.

Trihydric or more polyhydric alcohol is preferably used as the other starting material to be esterified with the partially fumarized and/or partially maleinized rosin in view of the molecular weight and the softening point of the stabilized rosin ester to be produced by the subsequent disproportionation reaction. Examples of useful polyhydric alcohols are glycerin, diglycerin, pentaerythritol, dipentaerythritol, etc. Preferred examples are glycerin and pentaerythritol.

The foregoing esterification reaction can be conducted in the same manner as usual esterification method. For example, the esterification can be carried out by heating the two components in the presence or absence of a catalyst and with or without a solvent. Suitable solvents include aromatic solvents such as benzene, toluene and xylene. Examples of the catalyst are those commonly used for esterification, e.g., acid catalysts such as sulfuric acid, acetic acid and p-toluenesulfonic acid, hydroxides of alkaline earth metals such as calcium hydroxide, metal oxides such as magnesium oxide and calcium oxide, calcium carbonate, magnesium acetate, calcium acetate, etc. The amounts of the two components are not particularly limited but can be suitably determined according to the kind and acid value of the partially fumarized and/or partially maleinized rosin, softening point of the esterification product thus obtained, etc. Generally the amounts thereof are such that the alcohol accounts for 10 to 15% by weight of the total mixture.

The esterification product obtained above can be disproportionated by various processes heretofore known. More specifically, the esterification product is heated to about 220° to about 300° C. in the presence of a catalyst commonly used for disproportionation. Useful catalysts for disproportionation include noble metals such as palladium, nickel and platinum; iodine and iodides such as iron iodide; sulfur compounds such as sulfur dioxide and iron sulfide; etc. In this way, the stabilized rosin ester useful in the present invention is prepared. The use of the stabilized rosin ester is critical in this invention and the contemplated results of the present invention can be achieved only with its use. While the reason therefor remains to be clarified, it is presumably because the resin is imparted an appropriate polarity by the disproportionation, and thereby given an improved ability to retain the plasticizer and a higher compatibility with the rubber. The stabilization of esterified product which can be achieved by the disproportionation described above may also be conducted by hydrogenation. However, the resin obtained by hydrogenation, when used as the tackifying resin, encounters difficulty in inhibiting the transfer of plasticizer to a satisfactory extent, and consequently can not be used to accomplish the contemplated results of the present invention. Moreover, hydrogenation is disadvantageous in respect of economy, ease of reaction, etc., as compared with the disproportionation.

The stabilized rosin ester to be used in the present invention can be prepared by other processes as well as by the foregoing process. For example, fumarized or maleinized rosin serving as the starting material is disproportionated, followed by esterification. The disproportionation and esterification in this process can be conducted at the same time. The reaction in these processes can be performed under the same conditions as in the conventional processes, for instance, conditions similar to those as stated above.

The stabilized rosin ester thus obtained generally has a softening point of 110° to 140° C., preferably 115° to 135° C., a molecular weight of about 1000 to about 1800, preferably about 1100 to about 1500, and an acid value of approximately up to 20 and thus can be effectively used as the tackifying resin of the present invention. The rosin esters having a softening point far below 110° C. or a molecular weight markedly lower than 1000 are likely to permit the transfer of plasticizer. The resins with a softening point much higher than 140° C. or a molecular weight greatly exceeding 1800 are liable to give a lower compatibility and a reduced tack. If the resin has an acid value of over 20, no big problem is caused, but the resin having too high an acid value tends to provide a slightly lower compatibility.

The pressure-sensitive adhesive composition of the present invention comprises, as major components, the stabilized rosin ester as the tackifying resin, a block rubber and a plasticizer. The plasticizer useful in the present invention can be any of those extensively used heretofore for this type of pressure-sensitive adhesives. Examples of useful plasticizers are naphthene type mineral oil, polybutene, biphenyl chloride, dioctyl phthalate, etc. Naphthene-type mineral oil is preferably used when taking account into the ability of the pressure-sensitive adhesive to be applied to a substrate and economy. The suitable proportions of the three components are 70 to 150 parts by weight of the tackifying resin and 40 to 120 parts by weight of the plasticizer per 100 parts by weight of the block rubber. When incorporating these components in the above ratios, a useful pressure-sensitive adhesive can be prepared which is high in compatibility, aging resistance, thermostability and adhesive property and is economically advantageous.

When required, the pressure-sensitive adhesive composition of the present invention can contain aliphatic petroleum resin ($C_5$ resin), a copolymer of aliphatic and aromatic petroleum resins ($C_2/C_9$ resin) or the like from an economical viewpoint, and hydrogenated petroleum resin for the purpose of making the final product light-colored, insofar as the inclusion of these resins does not impair the contemplated results of the present invention.

For practical use, the pressure-sensitive adhesive composition of the present invention thus obtained is mixed together by a roller homogenizer, melted by being heated, applied to a substrate, and treated by a calender roller to form pressure-sensitive adhesive film, according to conventional methods. Or the composition is dissolved in a solvent and the solution is applied to a substrate by a spreader, applicator or the like and dried by being heated to form pressure-sensitive adhesive film. These methods are the same as those conventionally carried out with this type of compositions heretofore known. The adhesive film thus prepared is used for practical purpose in the same manner as this kind of known adhesive films. Examples of substrates are those of cellophane, paper, film of plastics such as polyester, etc.

The pressure-sensitive adhesives of the present invention will be described below in more detail with reference to the following reference examples, working examples and comparison examples.

REFERENCE EXAMPLE 1

One hundred part by weight of gum rosin was placed in a 4-necked flask equipped with a stirrer, condenser, water separator and inlet tube for introducing nitrogen. The rosin was heated with stirring to 160° C. in an atmosphere of nitrogen to give a molten mass. One part by weight of fumaric acid (2.6 mole % relative to the rosin) was added to the system, and the resulting mixture was heated with stirring to 220° C. to undergo fumarization reaction. Thereafter 0.07 part by weight of palladium carbon (5% of palladium supported by carbon and containing 50% of water) was added and the mixture was maintained at 280° C. for about 3 hours to complete the disproportionation reaction. The resulting reaction product was filtered in a molten state to remove the palladium carbon, giving partially fumarized, disproportionated rosin. The fumarization product (100 parts by weight) and pentaerythritol (11.4 parts by weight) were charged into the reactor and the mixture was subjected to esterification in an atmosphere of nitrogen at 285° C. for 12 hours, affording the stabilized rosin ester of the present invention. The rosin ester thus obtained was found to have a softening point of 114° C., acid value of 15.6 and Gardner color of 7.

REFERENCE EXAMPLES 2-7

The general procedure of Reference Example 1 was repeated except that at least one of the kind of the rosin as the starting material, kind of dibasic acid (fumaric acid or maleic anhydride), its amount, kind of polyhydric alcohol and its amount was changed as shown below in Table 1 which also demonstrates the stabilized rosin esters thus obtained.

TABLE 1

| Ref. Ex. | Rosin | Dibasic acid Kind | Dibasic acid Amount (mole %, relative to rosin) | Polyhydric alcohol Kind | Polyhydric alcohol Amount (weight %, relative to rosin) | Softening point (°C.) | Acid value | Gardner color |
|---|---|---|---|---|---|---|---|---|
| 1 | Gum rosin | Fumaric acid | 2.6 | Pentaerythritol | 11.5 | 114 | 15.6 | 7 |
| 2 | " | " | 7.8 | " | 12.2 | 125 | 16.8 | 6+ |
| 3 | " | " | 13.0 | " | 12.9 | 134 | 18.5 | 7 |
| 4 | " | " | 7.8 | Glycerin | 12.9 | 112 | 10.5 | 6 |
| 5 | " | " | 17.5 | " | 15.0 | 132 | 9.5 | 7 |
| 6 | " | Maleic anhydride | 7.8 | Pentaerythritol | 12.2 | 126 | 17.5 | 7 |
| 7 | Tall oil rosin | Fumaric acid | 10.0 | " | 12.6 | 122 | 16.7 | 9 |

EXAMPLE 1

Using the stabilized rosin ester prepared in Reference Example 1, three compounds were prepared which each had compositions A, B, and C, respectively in the ratios (part by weight) as shown below in Table 2. The compounds were each heated with stirring to 180° C. in an atmosphere of inert gas for 3 hours, giving three kinds of homogeneous hot melt pressure-sensitive adhesives.

TABLE 2

| Sample | Block rubber | Tackifying resin | Plasticizer | Stabilizer |
|---|---|---|---|---|
| Composition A | (SIS) 100 wt. parts | 100 wt. parts | 50 wt. parts | 2 wt. parts |
| Composition B | (SIS) 100 wt. parts | 120 wt. parts | 100 wt. parts | 2 wt. parts |
| Composition C | (SBS) 100 wt. parts | 100 wt. parts | 50 wt. parts | 2 wt. parts |

The components as shown in Table 2 are as follows.
SIS — Styrene/isoprene/styrene block copolymer (product of Shell Chemical Co., Ltd., trade name; "KRATON-1107")
SBS — Styrene/butadiene/styrene block copolymer (product of the same company as above, trade name; "KRATON-1102")
Plasticizer — Naphthene-type oil (product of the same company as above, trade name; "Shellflex-371")
Stabilizer — Product of Ciba-Geigy, trade name; "Irganox 1010"

EXAMPLES 2-7

Compounds were prepared by repeating the general procedure of Example 1 except that the tackifying resins obtained in Reference Examples 2-7 were used in place of the tackifying resin prepared in Reference Example 1. The compounds thus obtained were treated in the same manner as in Example 1 to produce samples of hot melt pressure-sensitive adhesives.

COMPARISON EXAMPLES 1-5

Compounds were prepared by repeating the general procedure of Example 1 except that the tackifying resins shown below were used in place of the tackifying resin prepared in Reference Example 1. The compounds were made into samples of hot melt pressure-sensitive adhesives in the same manner as in Example 1.

| Comp. Ex. No. | Tackifying Resin | Manufacturer | Trade Mark | Softening Point (°C.) |
|---|---|---|---|---|
| 1 | C₅ aliphatic petroleum resin | Nippon Zeon | Quintone A-100 | 100 |
| 2 | Terpene resin | Yasuhara Yushi | YSPx-1150 | 115 |
| 3 | Hydrogenated petroleum resin | Exxon | Escorez 5320 | 125 |
| 4 | Pentaerythritol ester of maleinized rosin | Arakawa Kagaku Kogyo Kabushiki Kaisha | Malkyd No. 1 | 125 |
| 5 | Pentaerythritol ester of disproportionated rosin | | | 110 |

COMPARISON EXAMPLE 6

One hundred parts by weight of gum rosin was reacted with 3 parts by weight of fumaric acid in the same manner as in Reference Example 1 to give fumarized rosin. In an autoclave were placed 107.8 parts by weight of the fumarized rosin and 0.5 part by weight of diatomaceous earth nickel (50% nickel supported). The mixture was maintained under 200 atmospheres and at 250° C. for 3 hours to complete the hydrogenation. The mixture was filtered in a molten state to remove the diatomaceous earth nickel, giving partially fumarized, hydrogenated rosin ester. Esterification was conducted using 100 parts by weight of the fumarization product and 12.2 parts by weight of pentaerythritol in the same manner as in Reference Example 1 to obtain partially fumarized, hydrogenated rosin ester. The rosin ester thus obtained was found to have a softening point of 116° C., acid value of 17.0 and Gardner color of 8. Compounds were prepared in the same manner as in Example 1 using the foregoing resin as the tackifying resin, and the compounds were made into samples of hot melt pressure sensitive adhesives by the same method as in Example 1.

The samples obtained above (those prepared from the compounds each having compositions A, B and C, respectively in Examples 1 to 7 and Comparison Examples 1 to 6) were each applied by a hot melt applicator to the surface of polyester film to a thickness of 30μ to produce adhesive tapes to be used for tests. The tapes thus formed were tested for properties by the following methods to evaluate the adhesion to corrugated boards and the degree in which the plasticizer bled through labels.

Methods of tests

1. Adhesion to corrugated boards

The test adhesive tape was adhered to a surface area measuring 1 in.×0.5 in. of corrugated board, and the adhered parts were pulled with a load of 3 kg at an ordinary temperature to measure the time taken to separate the adhered parts.

2. Extent of plasticizer bleeding in label

A sheet of wood free paper was adhered to the surface of the test adhesive tape and was left to stand in an air-circulating oven for 3 days. Then the degree in which the plasticizer bled into the wood-free paper was determined with unaided eye and evaluated according the following ratings.

○ . . . Not bled
◉ . . A little bled
Δ . . . Considerably bled
X . . . Thoroughly bled Table 3 below shows the results.

TABLE 3

| | Composition A | | Composition B | | Composition C | |
|---|---|---|---|---|---|---|
| | Adhesion to cor. board (min) | Bleeding degree | Adhesion to cor. board (min) | Bleeding degree | Adhesion to cor. board (min) | Bleeding degree |
| Ex. No. | | | | | | |
| 1 | >30 | ○ | 15 | Δ | >30 | ◉ |
| 2 | >30 | ◉ | 25 | ○ | >30 | ◉ |
| 3 | 25 | ◉ | 10 | ○ | >30 | ◉ |
| 4 | 28 | ○ | 10 | Δ | >30 | ◉ |
| 5 | 25 | ◉ | 13 | ○ | >30 | ◉ |
| 6 | >30 | ◉ | 20 | ○ | >30 | ◉ |
| 7 | >30 | ◉ | 23 | ○ | >30 | ◉ |
| Comp. Ex. No. | | | | | | |
| 1 | 10 | X | <1 | X | 8 | X |
| 2 | 10 | X | <1 | X | 10 | X |
| 3 | 18 | X | <1 | X | 15 | Δ |
| 4 | <1 | Δ | <1 | X | <1 | Δ |
| 5 | 15 | X | <1 | X | 20 | Δ |
| 6 | 20 | Δ | 3 | X | 20 | Δ |

We claim:

1. A pressure-sensitive adhesive composition comprising a block rubber, a tackifying resin and a plasticizer as major components, the composition being characterized in that the tackifying resin is partially fumarized and/or partially maleinized, disproportionated rosin ester.

2. A composition as defined in claim 1 wherein the block rubber is polystyrene-polyisoprene-polystyrene block copolymer or polystyrene-polybutadiene-polystyrene block copolymer.

3. A composition as defined in claim 1 wherein the tackifying resin is fumarized or maleinized in a ratio of 1.3 to 20 mole % based on the rosin.

4. A composition as defined in claim 3 wherein the tackifying resin is fumarized or maleinized in a ratio of 2.6 to 13 mole % based on the rosin.

5. A composition as defined in claim 1 where in the ester serving as the tackifying resin is an ester of polyhydric alcohol.

6. A composition as defined in claim 5 wherein the polyhydric alcohol is glycerin or pentaerythritol.

7. A composition as defined in claim 1 wherein the tackifying resin has a softening point of 110° to 140° C.

8. A composition as defined in claim 7 wherein the tackifying resin has a softening point of 115° to 135° C.

9. A composition as defined in claim 1 wherein the tackifying resin has a molecular weight of about 1000 to about 1800 and an acid value of up to about 20.

10. A composition as defined in claim 1 wherein the ratio of the block rubber, tackifying resin and plasticizer by weight is 100:70–150:40–120.

* * * * *